(12) United States Patent
Knight

(10) Patent No.: US 9,376,096 B2
(45) Date of Patent: Jun. 28, 2016

(54) APPARATUS AND METHOD FOR CONTROLLING A HYDRAULIC BRAKE OF AN AIRCRAFT

(71) Applicant: Gulfstream Aerospace Corporation, Savannah, GA (US)

(72) Inventor: Michael Knight, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/460,651

(22) Filed: Aug. 15, 2014

(65) Prior Publication Data

US 2016/0046270 A1    Feb. 18, 2016

(51) Int. Cl.
*B60T 13/14* (2006.01)
*B64C 25/44* (2006.01)

(52) U.S. Cl.
CPC *B60T 13/14* (2013.01); *B64C 25/44* (2013.01)

(58) Field of Classification Search
CPC .................................. B60T 13/14; B60T 8/325

USPC ...................... 303/10, 11, 80, 85, DIG. 11, 64
See application file for complete search history.

(56) References Cited

U.S. PATENT DOCUMENTS

| 3,887,239 A * | 6/1975 | Engle ............................. 303/128 |
| 4,264,109 A * | 4/1981 | Knox et al. ...................... 303/10 |
| 2006/0071547 A1 * | 4/2006 | Holder .................... B60T 8/325 303/117.1 |
| 2012/0133200 A1 * | 5/2012 | Oyama et al. ................... 303/10 |
| 2014/0014447 A1 * | 1/2014 | O'Connell et al. ........ 188/151 R |

\* cited by examiner

*Primary Examiner* — Melanie Torres Williams
(74) *Attorney, Agent, or Firm* — Ingrassia, Fisher & Lorenz PC

(57) ABSTRACT

An apparatus for controlling a hydraulically-actuated brake of an aircraft includes a brake control unit. The brake control unit is configured to receive a brake signal from an operator of the aircraft. A pump is in fluidic communication with a reservoir for holding hydraulic fluid and the brake for supplying the hydraulic fluid from the reservoir to the brake. An electric motor is in communication with the brake control unit and coupled to the pump to control pressure of the hydraulic fluid supplied by the pump in accordance with the brake signal.

11 Claims, 3 Drawing Sheets

APPARATUS AND METHOD FOR CONTROLLING A HYDRAULIC BRAKE OF AN AIRCRAFT

TECHNICAL FIELD

The technical field relates generally to braking systems for aircraft and specifically to hydraulically-actuated braking systems for aircraft.

BACKGROUND

Aircraft may include one or more hydraulic systems to actuate various devices, including the brakes. Typically, in the event of a failure of one or more of the hydraulic systems, hydraulic brake accumulators provide limited hydraulic pressure to the brakes. The accumulators act as energy storage devices by maintaining hydraulic pressure. However, once the stored energy, i.e., pressure, is used, it is not available again until the accumulator is recharged.

Thus, upon landing of the aircraft after a hydraulic failure, any cycling of the brakes uses up some of the stored pressure in the accumulator until the pressure drops below a useful level. Depending upon pilot braking technique or the function of an autobraking and/or anti-skid system, the stored pressure in the accumulator can be depleted very rapidly resulting in little or no brake function after initial brake application. The accumulators could be increased in size/capacity to account for these variations. However, doing so adds undesired weight and volume to the aircraft.

Furthermore, the published aircraft takeoff or landing performance may be artificially degraded to account for variations in braking performance. This results in longer takeoff and landing distances or reduced payload.

As such, it is desirable to provide a braking system that does not require hydraulic brake accumulators. In addition, other desirable features and characteristics will become apparent from the subsequent summary and detailed description, and the appended claims, taken in conjunction with the accompanying drawings and this background.

BRIEF SUMMARY

In one embodiment, an apparatus for controlling a hydraulically-actuated brake of an aircraft includes a brake control unit. The brake control unit is configured to receive a brake signal from an operator of the aircraft. The apparatus also includes a reservoir for holding hydraulic fluid. A pump is in fluidic communication with the reservoir and the brake and is configured to supply the hydraulic fluid from the reservoir to the brake. The apparatus also includes an electric motor in communication with the brake control unit and coupled to the pump to control pressure of the hydraulic fluid in accordance with the brake signal.

In one embodiment, an aircraft includes a hydraulically-actuated brake. A brake control unit is configured to receive a brake signal from an operator of the aircraft. The aircraft also includes a reservoir for holding hydraulic fluid. A pump is in fluidic communication with the reservoir and the brake and configured to supply the hydraulic fluid from the reservoir to the brake. The aircraft also includes an electric motor in communication with the brake control unit and coupled to the pump to control pressure of the hydraulic fluid in accordance with the brake signal.

In one embodiment, a method of controlling a hydraulically-actuated brake of an aircraft includes receiving a brake signal from an operator of the aircraft at a brake control unit. The method also includes supplying hydraulic fluid from a reservoir to a brake. The method further includes controlling pressure of the hydraulic fluid with an electric motor in communication with the brake control unit and coupled to a pump in accordance with the brake signal.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, an apparatus 100 for controlling a hydraulically-actuated brake 102, 104, 106, 108 of an aircraft 110 is shown and described herein. Although the apparatus 100 is described with respect to the aircraft 110, it should be appreciated that the apparatus 100 may be implemented with other vehicles including, but not limited to, automobiles.

Figure 1:
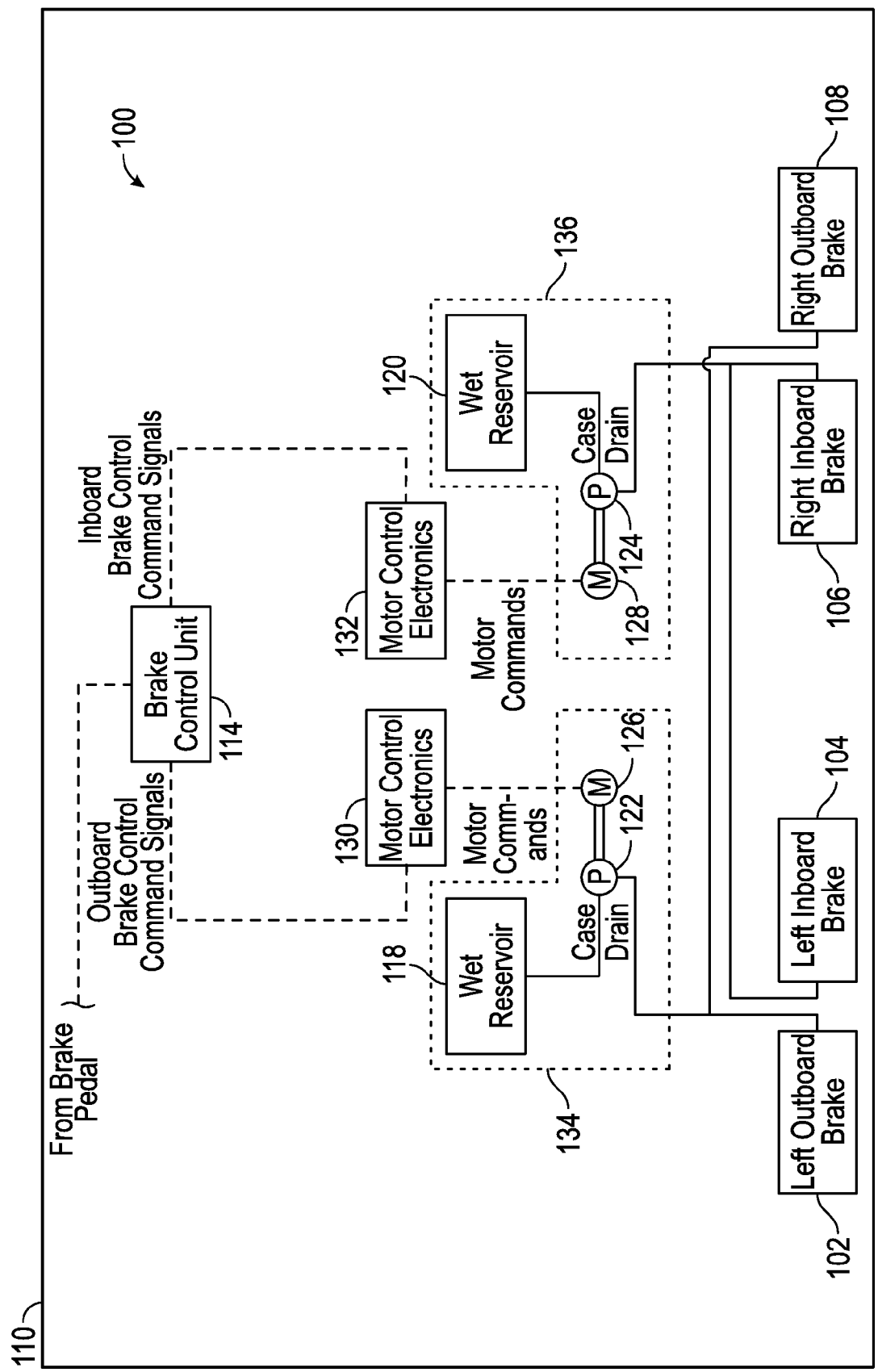
FIG. 1 is a block diagram of an apparatus for controlling a brake of an aircraft, according to one embodiment.

In the exemplary embodiment shown in FIG. 1, the hydraulically-actuated brake 102, 104, 106, 108 is implemented as a left outboard brake 102, a left inboard brake 104, a right inboard brake 106, and a right outboard brake 108. The left brakes 102, 104 are disposed on the port side of the aircraft 110, i.e., the left side as perceived by a person facing in the forward travel direction. The right brakes 106, 108 are disposed on the starboard side of the aircraft 110, i.e., the right side as perceived by a person facing in the forward travel direction. The inboard brakes 104, 106 are disposed closer to a center (not shown) of the aircraft 110 with respect to the outboard brakes 102, 108. It should be appreciated that the apparatus 100 may be implemented in aircraft with any number of brakes 102, 104, 106, 108.

The apparatus 100 includes a brake control unit 114. The brake control unit 114 of the exemplary embodiment includes a processor (not shown). The processor of the exemplary embodiment is a semi-conductor based device capable of performing calculations, executing instructions (i.e., running a program), and/or otherwise manipulating data. However, in other embodiments, the brake control unit 114 may be implemented with other devices and/or hardware.

The brake control unit 114 is configured to receive a brake signal from an operator of the aircraft 104, e.g., a pilot. The brake signal may vary in some characteristic to correspond to a pressure exerted on a brake pedal (not shown) by the operator. As just one example, the current or voltage of the brake signal may vary corresponding to the exerted pressure.

The apparatus 100 also includes a reservoir 118, 120 for holding hydraulic fluid. In the exemplary embodiment, the reservoir 118, 120 is implemented with a first reservoir 118 and a second reservoir 120. However, it is should be appreciated that any number of reservoirs 118, 120 may be implemented depending on the particular requirements of the aircraft 104 or other vehicle.

The apparatus 100 also includes a pump 122, 124 in fluidic communication with the reservoir 118, 120. That is, the pump 122, 124 receives hydraulic fluid from the reservoir 118, 120. Specifically, in the exemplary embodiment, the pump 122, 124 is implemented with a first pump 122 in fluidic communication with the first reservoir 118 and a second pump 124 in fluidic communication with the second reservoir 120.

The pump 122, 124 is also in fluidic communication with the brake 102, 104, 106, 108. Accordingly, the pump 122, 124 is configured to supply the hydraulic fluid from the reservoir 118, 120 to the brake 102, 104, 106, 108. More specifically, in the exemplary embodiments, the first pump 122 is in fluidic communication with the left outboard brake 102 and the right outboard brake 108 and the second pump 124 is in fluidic communication with the left inboard brake 104 and the right inboard brake 106. With this configuration, hydraulic fluid may be supplied to the brakes 102, 104, 106, 108 on both the left and right side of the plane, even if one of the pumps 122, 124 malfunctions. However, other configurations between the pumps 122, 124 and the brakes 102, 104, 106, 108 may be implemented.

The apparatus 100 further includes an electric motor 126, 128 coupled to the pump 122, 124 for actuating the pump 122, 124. In the exemplary embodiments, a first electric motor 126 is coupled to the first pump 122 and a second electric motor 128 is coupled to the second pump 124.

The electric motor 126, 128 is in communication with the brake control unit 114. The brake control unit 114 is configured to output, i.e., transmit, a brake control command signal that corresponds to the brake signal. That is, the brake control command signal varies in some characteristic to correspond to the pressure exerted on the brake pedal by the operator. In the exemplary embodiment, the brake control unit 114 is configured to output an outboard brake control command signal and an inboard brake control command signal. The electric motors 126, 128 of the exemplary embodiment are configured to receive the brake control command signals and control pressure of the hydraulic fluid in accordance with these signals.

The apparatus 100 may also include a motor control device 130, 132 in communication with the brake control unit 114 and the electric motor 126, 128. In the exemplary embodiment, the apparatus 100 includes a first motor control device 130 in communication with the brake control unit 114 and the first electric motor 126 and a second motor control device 132 in communication with the brake control unit 114 and the second electric motor 126. The motor control device 130, 132 is configured to receive the brake control command signal from the brake control unit 114 and control the electric motor 126, 128 in accordance with the brake control command signal.

The electric motor 126, 128, the brake control unit 114, and/or the motor control device 130, 132 may be powered from the electrical systems (not shown) of the aircraft 110. For instance, when the engines (not shown) of the aircraft 110 are operational, electric power may be obtained from one or more generators (not shown) coupled to the engines. Alternatively, the electric power may be obtained from one or more batteries (not shown), particularly, when the aircraft 110 is parked. Thus, the batteries can provide power to actuate the brakes when parked.

A manifold 134, 136 may be utilized to form and/or house certain elements of the apparatus 100 as described above. Particularly, in the embodiment shown in FIG. 1, the apparatus 100 includes a first manifold 134 and a second manifold 136. The first manifold 134 forms the first reservoir 118, supports the first pump 122, and provides the fluidic connection between the first reservoir 118 and the first pump 122. Similarly, the second manifold 136 forms the second reservoir 120, supports the second pump 124, and provides the fluidic connection between the second reservoir 120 and the second pump 124.

Figure 2:
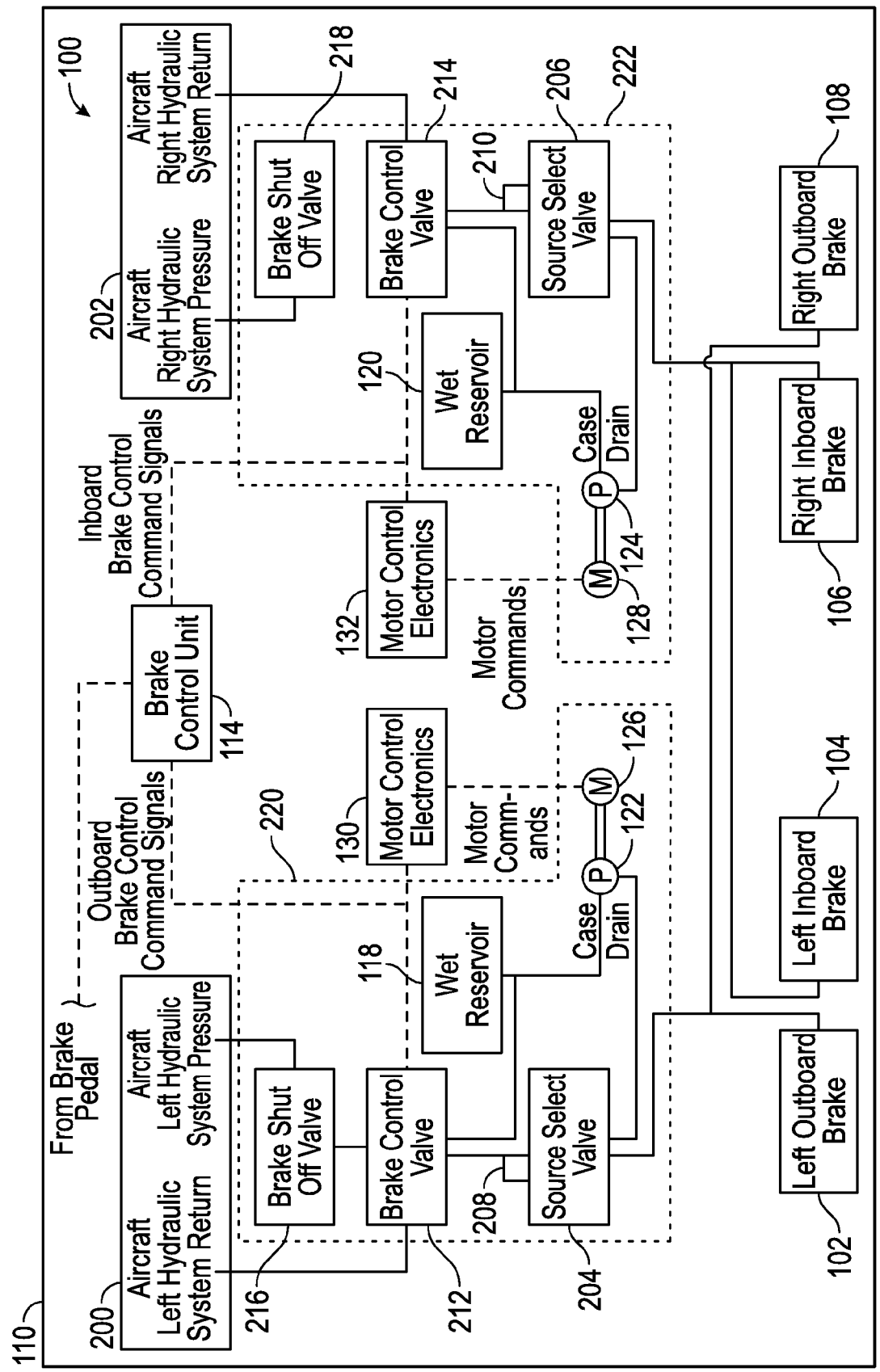
FIG. 2 is a block diagram of the apparatus according to another embodiment.

Referring now to FIG. 2, in some embodiments, the aircraft 110 may include a hydraulic system 200, 202 providing hydraulic fluid. In the embodiment shown in FIG. 2, the aircraft 110 includes a left hydraulic system 200 and a right hydraulic system 202. The hydraulic system 200, 202 may be utilized to actuate numerous parts (not shown) of the aircraft 110, including, but not limited to, an elevator, a rudder, ailerons, flaps, and landing gear. The hydraulic system 200, 202 may also be utilized to provide hydraulic fluid to actuate the brakes 102, 104, 106, 108. In such a case, the apparatus 100 may be utilized as a back-up to the hydraulic system 200, 202, or vice-versa.

The apparatus 100 includes a source selection valve 204, 206 in fluidic communication with the hydraulic system 200, 202, the pump 122, 124, and the brake 102, 104, 106, 108. Specifically, the source selection valve 204, 206 includes a first input (not numbered) coupled to the hydraulic system 200, 202, a second input (not numbered) coupled to the pump 122, 124, and an output coupled to the brake 102, 104, 106, 108. The source selection valve 204, 206 is configured to select hydraulic fluid from one of the hydraulic system 200, 202 and the pump 122, 124 and supply the hydraulic fluid to the brake 102, 104, 106, 108. Said another way, the source selection valve 204, 206 directs hydraulic fluid from either the first input or the second input to the output, and therefore to the brake 102, 104, 106, 108.

In the exemplary embodiment shown in FIG. 2, the apparatus includes a first source selection valve 204 and a second source selection valve 206. The inputs of the first source selection valve 204 are in fluidic communication with the left hydraulic system 200 and the first pump 122 and the output is in fluidic communication with the left outboard brake 102 and the right outboard brake 108. The inputs of the second source selection valve 206 are in fluidic communication with the right hydraulic system 202 and the second pump 124 and the output is in fluidic communication with the left inboard brake 104 and the right inboard brake 106.

The apparatus includes a pressure sensing device 208, 210 configured to sense a pressure of the hydraulic system 200, 202. Specifically, in the exemplary embodiment shown in FIG. 2, a first pressure sensing device 208 is configured to sense a pressure of the left hydraulic system 200 and a second pressure sensing device 210 is configured to sense a pressure of the right hydraulic system 202. The pressure sensing device 208, 210 is in communication with the source selection valve 204, 206. Under normal conditions, where the pressure of the hydraulic system 200, 202 is greater than a predetermined value, the source selection valve 204, 206 is configured to select hydraulic fluid from the hydraulic system 200, 202 and deliver the hydraulic fluid to the brake 102, 104, 106, 108. In response to an abnormal condition, where the pressure of the hydraulic system 200, 202 is less than a predetermined value, the source selection valve 204, 206 is configured to select hydraulic fluid from the pump 122, 124 and deliver the hydraulic fluid to the brake 102, 104, 106, 108. It should be appreciated that the location of the pressure sensing device 208, 210 shown in FIG. 2 is merely exemplary and that other locations of the pressure sensing device 208, 210 may be alternatively implemented.

The apparatus 100 may also include a brake control valve 212, 214 configured to control the hydraulic fluid between the hydraulic system 200, 202 and the brake 102, 104, 106, 108. In the exemplary embodiment shown in FIG. 2, a first brake control valve 212 is in fluidic communication with the left hydraulic system 200 and the first source selection valve 204. That is, the first brake control valve 212 is disposed fluidically between the left hydraulic system 200 and the first source selection valve 204. Similarly, a second brake control valve 214 is in fluidic communication with the right hydraulic system 202 and the second source selection valve 206. Said another way, the second brake control valve 214 is disposed fluidically between the right hydraulic system 202 and the second source selection valve 206.

The brake control valve 212, 214 is in communication with the brake control unit 114. The brake control valve 212, 214 is configured to receive the brake control command signal from the brake control unit 114 and control pressure of the hydraulic fluid in accordance with these signals. Specifically, in the exemplary embodiment, the first brake control valve 212 receives the outboard brake control command signal to control hydraulic fluid pressure to the outboard brakes 102, 108.

The aircraft 110 may also include a brake shut-off valve 216, 218 disposed between the hydraulic system 200, 202 and the brake control valve 212, 214. More specifically, in the embodiment shown in FIG. 2, the aircraft 110 includes a first brake shut-off valve 216 disposed between the left hydraulic system 200 and the first brake control valve 212 and a second brake shut-off valve 218 disposed between the right hydraulic system 202 and the second brake control valve 214.

A manifold 220, 222 may be utilized to form and/or house certain elements of the apparatus 100 of the embodiment shown in FIG. 2. Particularly, the apparatus 100 includes a first manifold 220 and a second manifold 222. The first manifold 220 forms the first reservoir 118, supports the first pump 122, forms the first brake shut-off valve 216 and the first brake control valve 212, and provides the fluidic connections between the aforementioned components. Similarly, the second manifold 222 forms the second reservoir 120, supports the second pump 124, forms the second brake shut-off valve 218 and the second brake control valve 214, and provides the fluidic connections between the aforementioned components.

Figure 3:
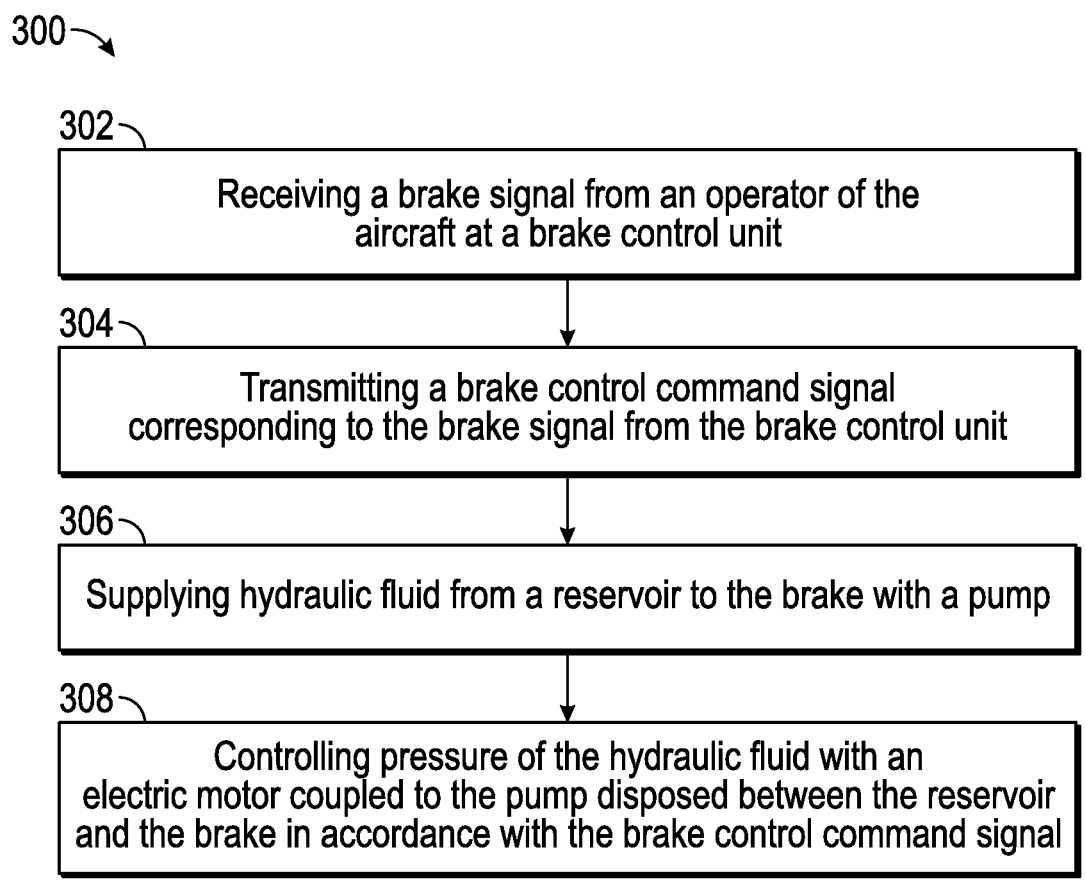
FIG. 3 is a flowchart of a method of controlling the brake of the aircraft.

Referring now to FIG. 3, a method 300 of controlling a hydraulically-actuated brake 102, 104, 106, 108 is shown. The method 300 may be implemented using the apparatus 100 described above. However, the method 300 may alternatively be implemented using other components, devices and/or hardware.

The method 300 includes, at label 302, receiving a brake signal from an operator of the aircraft 110 at a brake control unit 114. The method then includes, at label 304, transmitting a brake control command signal corresponding to the brake signal from the brake control unit 114.

The method 300 further includes, at label 306, supplying hydraulic fluid from a reservoir 118, 120 to the brake 102, 104, 106, 108 with a pump 122, 124. The method 300 also includes, at label 308, controlling pressure of the hydraulic fluid with an electric motor 126, 128 coupled to the pump 122, 124 in accordance with the brake control command signal.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An apparatus for controlling a hydraulically-actuated brake of an aircraft, said apparatus comprising:
a brake control unit configured to receive a brake signal corresponding to actuation of a brake control input device from an operator of the aircraft;
a reservoir for holding hydraulic fluid;
a pump in fluidic communication with said reservoir and the brake and configured to supply the hydraulic fluid from said reservoir to the brake; and
an electric motor in communication with said brake control unit and coupled to said pump to control pressure of the hydraulic fluid in accordance with the brake signal,
wherein the aircraft includes a hydraulic system providing hydraulic fluid, said apparatus further comprising a source selection valve in fluidic communication with the hydraulic system, said pump, and the brake and configured to select hydraulic fluid from one of the hydraulic system and said pump and supply the hydraulic fluid to the brake, and
wherein the apparatus further comprises a pressure sensing device configured to sense a pressure of the hydraulic system and in communication with said source selection valve and wherein said source selection valve is configured to select hydraulic fluid from said pump and deliver the hydraulic fluid to the brake in response to a pressure of the hydraulic system being less than a predetermined value.

2. The apparatus as set forth in claim 1, further comprising a brake control valve in communication with said brake control unit and disposed fluidically between the hydraulic system and said source selection valve to control pressure of the hydraulic fluid in accordance with the brake signal.

3. The apparatus as set forth in claim 1, further comprising a motor control device in communication with said brake control unit and said electric motor and configured to receive a brake control unit signal from said brake control unit corresponding to the brake signal and control said electric motor in accordance with said brake control unit signal.

4. An aircraft comprising:
a hydraulically-actuated brake,
a brake control unit configured to receive a brake signal corresponding to actuation of a brake control input device from an operator of said aircraft;
a reservoir for holding hydraulic fluid;
a pump in fluidic communication with said reservoir and said brake and configured to supply the hydraulic fluid from said reservoir to said brake;
an electric motor in communication with said brake control unit and coupled to said pump to control pressure of the hydraulic fluid in accordance with the brake signal;
a hydraulic system providing hydraulic fluid;
a source selection valve in fluidic communication with said hydraulic system, said pump, and said brake and configured to select hydraulic fluid from one of said hydraulic system and said pump and supply the hydraulic fluid to the brake; and
a pressure sensing device in communication with said source selection valve and configured to sense a pressure of said hydraulic system,
wherein said source selection valve is configured to select hydraulic fluid from said pump and supply the hydraulic fluid from said pump to said brake in response to a pressure of said hydraulic system being less than a predetermined value.

5. The aircraft as set forth in claim 4, further comprising a brake control valve in communication with said brake control unit and disposed fluidically between said hydraulic system and said source selection valve to control pressure of the hydraulic fluid in accordance with the brake signal.

6. The aircraft as set forth in claim 4, further comprising a motor control device in communication with said brake control unit and said electric motor and configured to receive a brake control unit signal from said brake control unit corresponding to the brake signal and control said electric motor in accordance with said brake control unit signal.

7. The aircraft as set forth in claim 4, wherein
said brake comprises a left outboard brake, a left inboard brake, a right inboard brake, and a right outboard brake;
said reservoir comprises a first reservoir and a second reservoir;
said electric motor comprises a first electric motor and a second electric motor;
said pump comprises
a first pump coupled to said first electric motor and in fluidic communication with said first reservoir, said left outboard brake, and said right outboard brake to supply the hydraulic fluid from said first reservoir to said outboard brakes, and
a second pump coupled to said second electric motor and in fluidic communication with said second reservoir, said left inboard brake, and said right inboard brake to supply the hydraulic fluid from said second reservoir to said inboard brakes.

8. A method of controlling a hydraulically-actuated brake of an aircraft, the method comprising:

receiving a brake signal corresponding to actuation of a brake control input device from an operator of the aircraft at a brake control unit;
transmitting a brake control command signal corresponding to the brake signal from the brake control unit;
supplying hydraulic fluid from a reservoir to the brake with a pump;
controlling pressure of the hydraulic fluid with an electric motor coupled to the pump disposed between the reservoir and the brake in accordance with the brake control command signal; and
sensing a pressure of the hydraulic system.

9. The method as set forth in claim 8, further comprising selecting hydraulic fluid from either the pump or a hydraulic system of the aircraft with a source selection valve and supplying the hydraulic fluid to the brake.

10. The method as set forth in claim 8, further comprising selecting hydraulic fluid from the pump in response to a pressure of the hydraulic system being less than a predetermined value.

11. The method as set forth in claim 8, further comprising controlling pressure of the hydraulic fluid of the hydraulic system with a brake control valve in communication with the brake control unit in accordance with the brake signal.

* * * * *